(12) United States Patent
Stuart (10) Patent No.: US 6,823,144 B2
(45) Date of Patent: Nov. 23, 2004

(54) OPTICAL TRANSMISSION SYSTEM

(75) Inventor: Howard Roy Stuart, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 574 days.

(21) Appl. No.: 09/892,180

(22) Filed: Jun. 26, 2001

(65) Prior Publication Data

US 2002/0196507 A1 Dec. 26, 2002

(51) Int. Cl.$^7$ .............................................. H04B 10/02
(52) U.S. Cl. ...................... 398/175; 398/176; 398/178; 398/140; 398/141; 398/147; 398/150; 398/173
(58) Field of Search ................................ 398/175, 176, 398/178, 140, 141, 147, 150, 173

(56) References Cited

U.S. PATENT DOCUMENTS 5,365,362 A * 11/1994 Gnauck et al. ............. 398/150
6,304,348 B1 * 10/2001 Watanabe ...................... 398/9

OTHER PUBLICATIONS

Sieben, M et al, "Optical Single Sideband Transmission at 10 Gb/s Using Only Electrical Dispersion Compensation", *J. Lightwave Technology*, vol. 17, No. 10, Oct. 1999, pp. 1742–1749.

Yonenaga, K., et al, "A Fiber Chromatic Dispersion Compensation Technique with an Optical SSB Transmission in Optical Homodyne Detection Systems", *IEEE Phot. Tech Lett.*, vol. 5, No. 8, Aug. 1993, pp. 949–951.

Lathi, B. P., *Modern Digital and Analog Communication Systems*, Oxford University Press, New York, 1998.

Yariv, A. et al, Compensation for channel dispersion by nonlinear optical phase conjugation, *Optical Letters*, vol. 4, No. 2, Feb. 1979, pp. 52–54.

Gnauck, A. H. et al., "10–Gb/s 360–km Transmission Over Dispersive Fiber Using Midsystem Spectral Inversion", *IEEE Photonics Tech. Lett.*, vol. 5, No. 6, Jun. 1993, pp. 663–666.

Kaminow, I. P. et al, *Optical Fiber Telecommunications IIIB*, Academic Press, San Diego, 1997.

I. Brener et al., "Cancellation of all Kerr nonlinearities in long fiber spans using a LiNbO$_3$ phase conjugator and Raman amplification", *OFC 2000 Post–deadline*, pp. 2–4.

* cited by examiner

*Primary Examiner*—Hanh Phan
(74) *Attorney, Agent, or Firm*—Barry H. Freedman

(57) ABSTRACT

An optical transmission system is provided which uses optical single-sideband (SSB) modulation and incorporates at least one mid-span analog SSB regenerator arranged to produce a phase conjugation of the transmitted signal. The phase conjugation technique, referred to here as complementary sideband regeneration (CSR), is accomplished on the retransmitted optical signal in the electrical domain, and requires no nonlinear optical techniques.

7 Claims, 6 Drawing Sheets

FIG. 1
(PRIOR ART)
SINGLE SPAN TRANSMISSION

FIG. 2
DATA SIGNAL AT TRANSMITTER

FIG. 4
DOUBLE-SPAN TRANSMISSION WITH SIGNAL INVERSION

FIG. 6
DOUBLE-SPAN TRANSMISSION WITH COMPLEMENTARY SIDEBAND REGENERATION AND SIGNAL INVERSION

FIG. 8
FOUR-SPAN TRANSMISSION WITH CSR REGENERATORS AND ALTERNATING SIGNAL INVERSION

FIG. 10d (DISTORTION HAS BEEN NEGLECTED)

FIG. 10e

FIG. 10f (DISTORTION HAS BEEN NEGLECTED)

OPTICAL TRANSMISSION SYSTEM

FIELD OF THE INVENTION

This invention relates generally to the field of optical communications, and in particular, to a method and apparatus for optical single-sideband (SSB) modulation that incorporates one or more mid-span analog (non-optical) SSB regenerators.

BACKGROUND OF THE INVENTION

Optical single sideband (SSB) modulation offers some advantages over conventional double sideband (DSB) modulation; in particular, the signal spectrum is reduced by a factor of two, enabling smaller channel spacing and increased immunity to dispersion effects. Furthermore, square-law detection of SSB signals is notably different from square-law detection of DSB signals: for SSB transmission, the phase information in the recovered baseband signal contains unambiguous information about the phase response of the optical transmission channel. This is not true for square-law-detected DSB signals, where phase information of the transmission channel is destroyed in the detection process (due to a spectrum backfolding effect described by M. Sieben, J. Conradi, D. E. Dodds, in an article entitled "Optical single sideband transmission at 10 Gb/s using only electrical dispersion compensation", *J. Lightwave Tech*. 17, 1742–49 (1999).

Optical SSB transmission is not without its pitfalls, however. The first challenge is how to generate these signals. One can incorporate SSB generation into the optical modulation by appropriately biasing and driving a lithium niobate Mach-Zender (MZ) modulator (see the M. Sieben et al. article cited above), or one can do the SSB generation post-modulation in the optical domain, using very precise optical filtering to eliminate one of the sidebands. See, for example, an article by K. Yonenaga and N. Takachio entitled "A fiber chromatic dispersion compensation technique with an optical SSB transmission in optical homodyne detection systems", *IEEE Phot. Tech. Lett*. 5, 949–951 (1993).) At the moment the former method seems preferable, though with pending improvements in optical filtering technologies and ever increasing modulation bandwidths, one should not rule out latter method. It is also important in all cases to minimize the degree of chirp introduced by the modulation process.

Another issue that must be addressed in relation to optical SSB transmission is the inherent distortion produced by square-law detection of an SSB signal. See, for example, page 178 of the textbook by B. P. Lathi entitled *Modern Digital and Analog Communication Systems* (Oxford University Press, New York, 1998). This distortion can be rather severe, and can be avoided by using smaller modulation depths, which undesirably results in a power penalty at the receiver. M. Sieben et al. (see article cited above) have proposed a novel modulation scheme for eliminating second-order distortion in SSB transmission. This scheme fails, however, in the presence of chromatic dispersion.

Another area of study relating to the current invention is a technique known as optical phase conjugation (OPC). See, for example, an article by A. Yariv, D. Fekete, D. M. Pepper, entitled "Compensation for channel dispersion by nonlinear optical phase conjugation", *Opt. Lett*. 4, 52–54 (1979) and an article by A. H. Gnauck, R. M. Jopson, and R. M Derosier, entitled "10-Gb/s 360-km transmission over dispersive fiber using midsystem spectral inversion", *IEEE Phot. Tech. Lett*. 5, 663–666 (1993). In OPC, nonlinear optical interactions are used to optically phase-conjugate a signal at the midpoint of a transmission span. When this is done, all even orders of chromatic dispersion are automatically compensated in the link. In addition, if the optical power distribution in the link is made symmetric about the mid-span point, all nonlinear signal degradations relating to the Kerr effect are also compensated. However, OPC requires nonlinear optical devices to accomplish the phase conjugation, and these devices are not readily commercially available.

SUMMARY OF THE INVENTION

An optical transmission system utilizes optical single-sideband (SSB) modulation and incorporates a novel mid-span analog SSB regenerator. The regeneration process, referred to as complementary sideband regeneration (CSR), causes a phase conjugation of the transmitted signal. This phase conjugation is accomplished in the electrical domain, is imprinted on the retransmitted optical signal, and requires no nonlinear optical techniques. If the CSR is performed at the mid-point between two identical spans of optical fiber, all even orders of chromatic dispersion are automatically compensated.

In one embodiment of the invention, a mid-span analog SSB regenerator is interposed between the first and second interconnected optical transmission line spans. An input signal is applied to an input transmitter, and modulates a carrier such that either the upper or lower sideband is transmitted on the first optical transmission line span to the mid-span regenerator. The SSB signal is square-law detected at the mid-span location, and is subsequently retransmitted over the second optical transmission line span. This retransmission also incorporates SSB modulation, with the transmitter arranged to modulate a carrier such that the other (i.e., lower or upper) complementary sideband is utilized for transmission. The process of regenerating the SSB optical signal with a sideband reversal causes a phase conjugation of the signal. As a result, at the receiver end of the second optical line span (which is assumed to be matched to first line span), all even orders of chromatic dispersion are compensated.

In another embodiment of the invention, the inherent distortion introduced by square-law detection of the SSB signals can be partially mitigated. This is accomplished by including signal inversion at the mid-span regenerator. For optical signals, which are always "positive" in nature, signal inversion implies that, after detection, large received signal voltages are retransmitted as small optical powers, and small received signal voltages are retransmitted as large optical powers, and that the time derivative of the received signal is reversed in sign. One method of accomplishing signal inversion is by suitably arranging the bias voltage of the MZ modulator in the regenerator transmitter. Upon square-law detection of the inverted signal by the receiver at the end of the second optical transmission span, the second-order distortion terms introduced by the SSB modulation format are cancelled. Note that the signal inversion technique does not require the two fiber spans to be matched to accomplish the distortion cancellation. However, this embodiment of distortion cancellation fails in the presence of chromatic dispersion.

In a further embodiment of the invention, cancellation of distortion terms caused by square-law detection of SSB signals can be accomplished even in the presence of chromatic dispersion, by using a four-span transmission with both CSR and signal inversion. In this embodiment, three mid-span analog SSB regenerators are interposed between four interconnected optical transmission line spans. The three regenerators are (a) spaced essentially evenly along the entire length of the optical transmission medium, such that the four fiber spans are matched and (b) arranged with electrical receivers and transmitters that (i) receive an SSB signal on one sideband (upper or lower) (ii) transmit the SSB signal on the other sideband (lower or upper, respectively), and (iii) in the first and third regenerators only, do signal inversion as described above. Again, the signal inversions can be conveniently accomplished by adjusting the modulation bias. This embodiment of the invention simultaneously accomplishes both the dispersion compensation and the SSB distortion cancellation described above.

BRIEF DESCRIPTION OF THE DRAWINGS

The present invention will be fully appreciated by consideration of the following detailed description, which should be read in light of the accompanying drawing in which.

DETAILED DESCRIPTION

Figure 1:
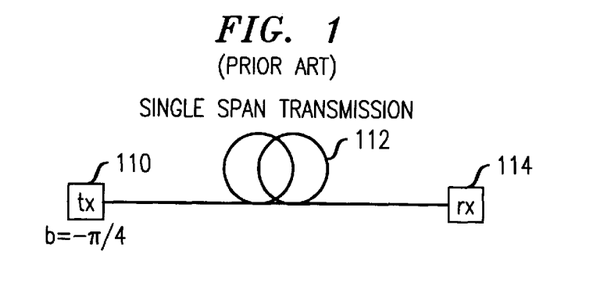
FIG. 1 a block diagram that illustrates a conventional single span transmission arrangement by which an SSB signal can be transmitted.

FIG. 1 is a block diagram that illustrates a conventional single span transmission arrangement by which an SSB signal can be transmitted from a transmitter 110 to a receiver 114 via a single fiber span 112. It is assumed, for comparison purposes described more fully below, that transmitter 110 is arranged to generate an SSB signal using conventional chirp-free MZ modulation with perfect post-modulation optical filtering. The output electric field of a dual arm MZ modulator driven with complementary waveforms (for chirp-free modulation) can, in accordance with I. P. Kaminow and T. L. Koch, *Optical Fiber Telecommunications IIIB*, Academic Press, San Diego, 1997, be written:

$$E_{out} = \frac{E_{in}}{2} \{e^{i(\pi z m(t)+b)} + e^{-i(\pi z m(t)+b)}\} e^{-i\omega t} \quad (1)$$

where m(t) is the data signal, z is the modulation depth and b is the modulator bias. The data m(t) is assumed to be an ac-coupled NRZ signal with $-0.5 < m(t) < 0.5$, and the bias b will set to either $b=\pi/4$ (inverting modulation) or $b=-\pi/4$ (non-inverting modulation) in the examples that follow. These parameters bias the modulator about the linear portion of its response curve, and the parameter z can be used to adjust the modulation depth; full modulation depth is achieved for $z=0.5$. The bit rate is assumed to be 40 Gbits/sec, and a $2^9-1$ pseudo-random bit sequence is used to generate simulated eye diagrams. The data is filtered prior to transmission using a rect-function filter with a cutoff frequency equal to the bit rate (identical filtering is placed in the receiver as well). While not ideal, this filtering was chosen for simplicity in these calculations.

Figure 2:
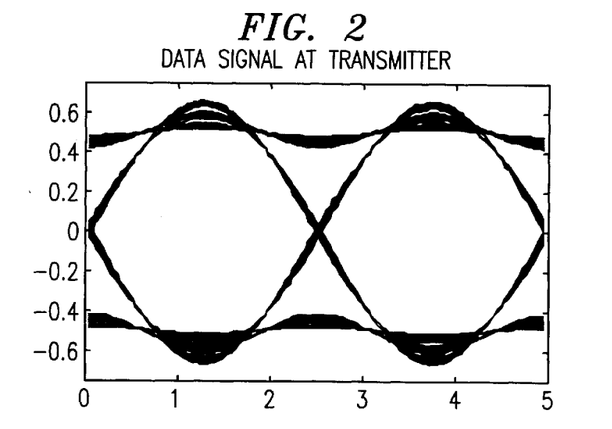
FIG. 2 is a filtered NRZ eye diagram of the input signal that could be used to drive optical transmitter 110 of FIG. 1.
Figure 3A:
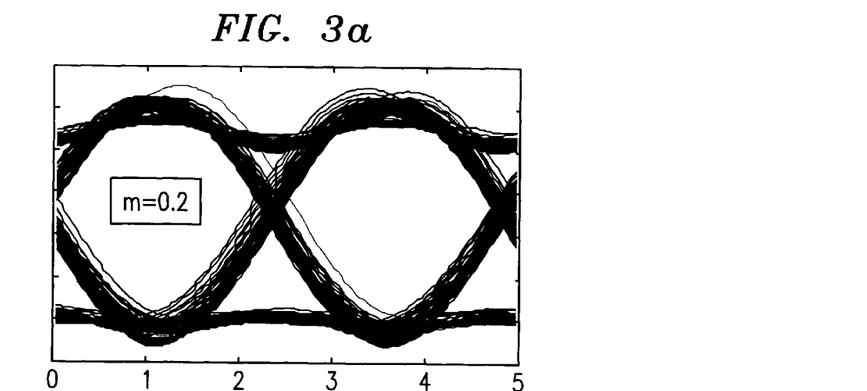
FIGS. 3(a) through 3(c) show eye diagrams for square-law-detected SSB signals received at receiver 114 of FIG. 1 for three values of m (m=0.2, 0.3, and 0.5) and assuming dispersion-free transmission.
Figure 3B:
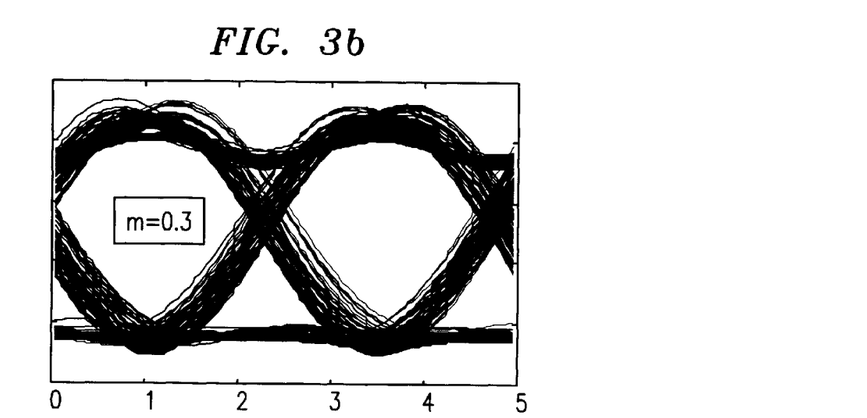
Figure 3C:
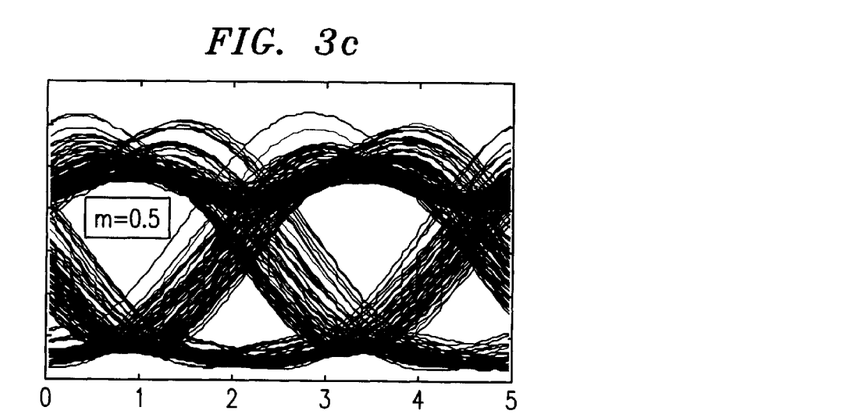

Using these assumptions, the filtered NRZ eye diagram of the signal that drives transmitter 110 of FIG. 1 is shown in FIG. 2. This is to be compared with the received eye diagrams for square-law-detected SSB signals for three values of z (z=0.2, 0.3, and 0.5) that are shown in FIGS. 3(a) through 3(c), respectively. (Note that these figures assume dispersion-free transmission and further assume that fiber loss, fiber nonlinearities, and noise are neglected, in order to isolate the effects of distortion and chromatic dispersion on the SSB transmission process). Distortion produced by the square-law detection process is evident, and is worst for the case of full modulation (z=0.5).

Figure 4:
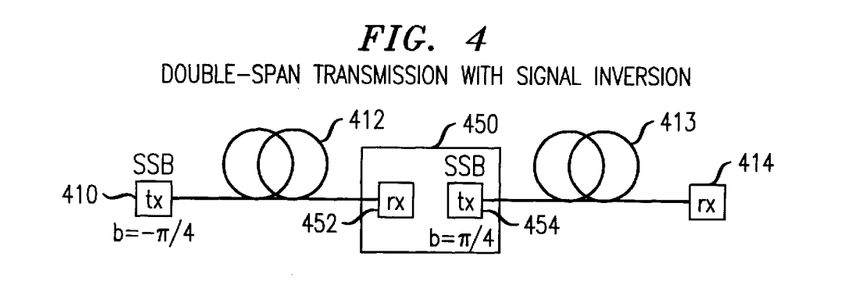
FIG. 4 is a block diagram of a two-stage transmission arrangement in accordance with the present invention that can be used to remove second-order SSB distortion effects.

In accordance with one embodiment of the present invention, a two-stage transmission arrangement illustrated in FIG. 4 can be used to remove second-order distortion effects arising from the SSB transmission format. In FIG. 4, a mid-span analog (non-optical) SSB regenerator 450 is positioned between SSB transmitter 410 and SSB receiver 414. A first fiber span 412 connects transmitter 410 (having modulator bias $b=-\pi/4$), to regenerator 450 and a second fiber span 413 connects regenerator 450 to receiver 414.

Regenerator 450 includes its own receiver 452 that detects the waveform (as shown in FIG. 3) re-modulates that waveform onto a second optical SSB signal, using its own transmitter 454. By arranging the second transmitter 454 to use an inverting modulation (MZ modulator bias $b=\pi/4$), the second-order distortion term cancels at the second square-law receiver 414. This occurs because the second square-law detector produces a distortion term that is opposite in sign to the one produced by the first square-law detector (this works regardless of whether the first transmitter is inverting or non-inverting).

Figure 5A:
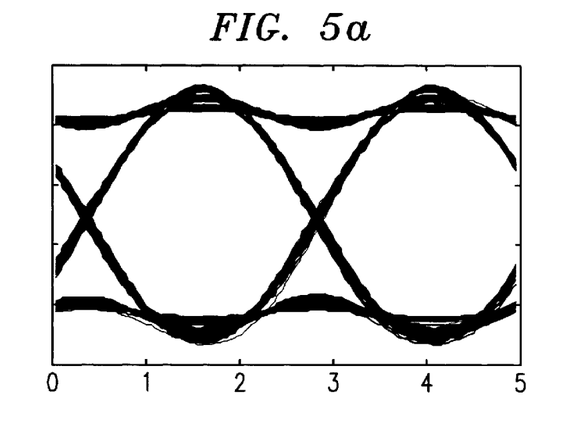
FIGS. 5(a) through 5(c) show improved eye diagrams (as compared to FIGS. 3(a) through 3(c)) for square-law-detected SSB signals received at receiver 414 of FIG. 4 for three values of m (m=0.2, 0.3, and 0.5) and assuming dispersion-free transmission.
Figure 5B:
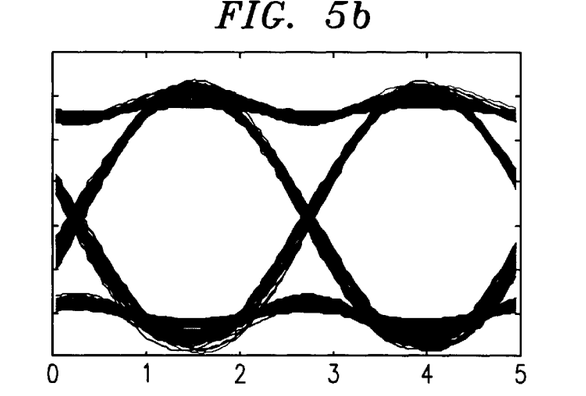
Figure 5C:
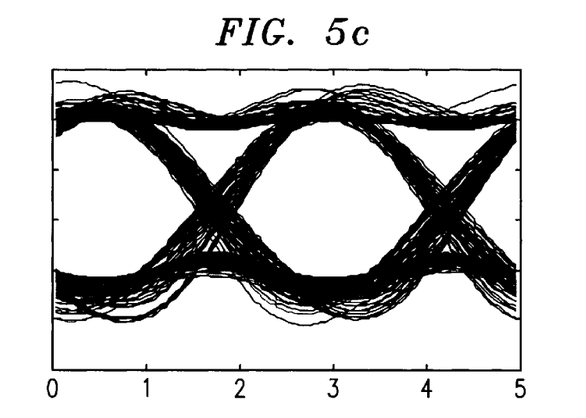

The received eye diagrams for the double-span dispersion-free transmission are shown in FIGS. 5(a) through 5(c), for three values of z (z=0.2, 0.3, and 0.5). Distortion is reduced, though higher order distortion terms are still present in received signals (as is evident from the dependence of distortion on the value of the modulation depth z). Note that the regenerator in this system must be analog: it must reproduce the detected waveform precisely to completely undo the second-order distortion. We have assumed that the regenerator shifts and scales the received waveform so as to preserve the condition −0.5<m(t)<0.5.

Figure 6:
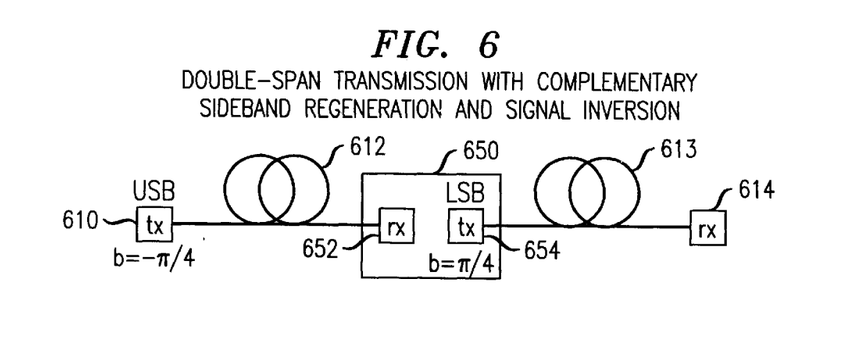
FIG. 6 is a block diagram of another embodiment of a two-stage transmission arrangement in accordance with the present invention, that can be used to remove the effects of even-ordered chromatic dispersion.

In accordance with another embodiment of the present invention, analog regeneration (in the electrical, rather than optical domain) can be used to also remove the effects of chromatic dispersion, as illustrated in FIG. 6. In this embodiment, two-stage transmission is again employed, where an analog regenerator 650 is placed at the approximate center point of a fiber span, thereby defining a first span of optical fiber 612 and a second span of optical fiber 613 that are approximately equal in length. It is assumed that the chromatic dispersion present in the first span is precisely the same as that present in the second span (as would be approximately true if the two spans consisted of equal lengths of the same type of fiber). In the embodiment of FIG. 6, the first SSB transmitter 610 is arranged to place the data on one of the sidebands (either one will work, we choose the upper sideband in FIG. 6). At mid-span, the dispersion-corrupted signal is square-law detected in receiver 652 and then re-transmitted over the second span using transmitter 654, with the transmission taking place on the complementary sideband (i.e. the sideband is 'flipped' from upper to lower as shown in FIG. 6). The regeneration is performed in an analog fashion, with the dispersion-corrupted waveform being reproduced as accurately as possible by the second transmitter 654. The "complementary sideband regeneration" (CSR) of FIG. 6 causes a phase conjugation of the regenerated signal. By transmitting the phase-conjugated signal over the second span of matched fiber, all even orders of chromatic dispersion are automatically compensated. In transmitter 654, inverting modulation is also used at the regenerator. Note, however, that the presence of chromatic dispersion in the two links prevents cancellation of the second-order SSB distortion as previously described in connection with FIG. 4.

Figure 7A:
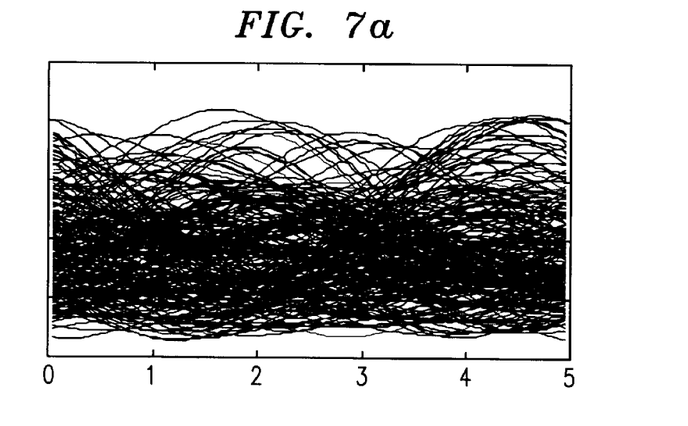
FIG. 7(a) shows the eye diagram for square-law-detected SSB signals received at the mid-span receiver 614 of FIG. 6.
Figure 7B:
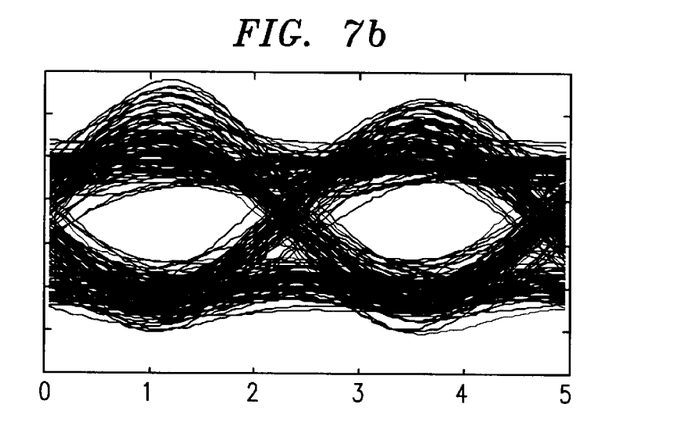
FIGS. 7(b) and 7(c) are eye diagrams for square-law-detected SSB signals received at the terminal receiver 614 of FIG. 6 for m=0.3 and for m=0.2, respectively.
Figure 7C:
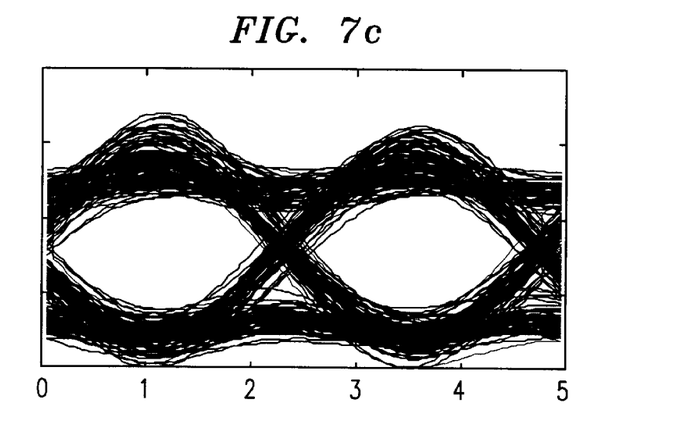

The dispersion compensation effect of mid-span CSR is illustrated in FIGS. 7(a) through 7(c). The transmitted 40 Gbits/sec optical SSB signal first propagates over 40 km of fiber with dispersion D=17 ps/km/nm. The received eye diagram at the regenerator is shown in FIG. 7(a); the eye is completely closed, as expected. This signal is scaled and shifted to preserve the condition −0.5<m(t)<0.5 and is then modulated onto the complementary sideband for the second half of the transmission. The regenerated signal then propagates over 40 km of fiber with identical dispersion properties as the first span. The received eye diagrams are shown in FIG. 7(b) (z=0.3) and FIG. 7(c) (z=0.2). The eyes are partially reopened by the second transmission, demonstrating the effect of mid-span phase conjugation. A complete reopening of the eye is not achieved, due to distortion effects in the SSB detection process. The presence of dispersion prevents perfect cancellation of the second-order distortion terms.

Figure 8:
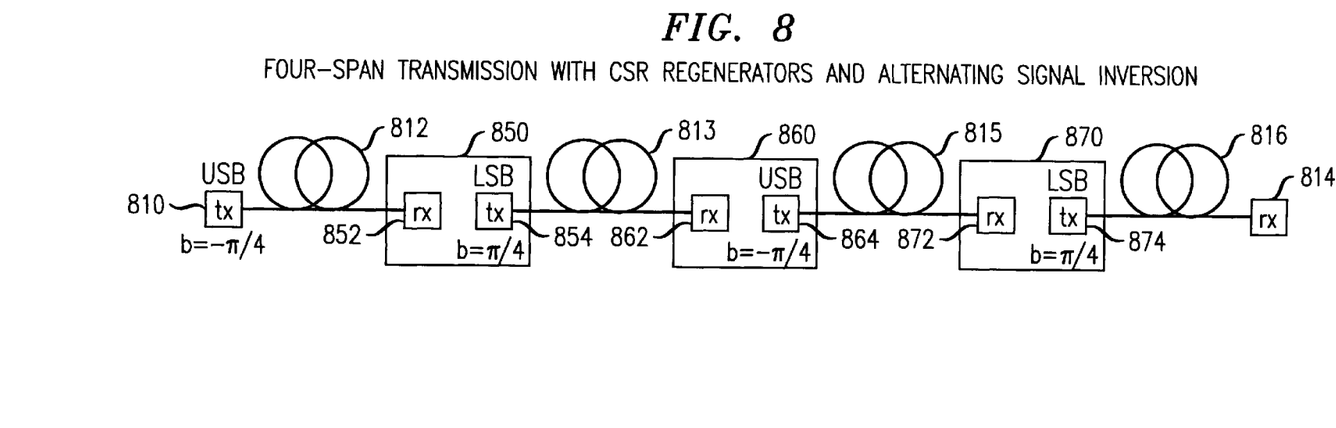
FIG. 8 is a block diagram of a four-span transmission arrangement in accordance with another embodiment of the present invention.

While as shown in FIG. 7, signal inversion does not work well in the two-span case when chromatic dispersion effects are included, the benefits of signal inversion for mitigating the SSB distortion can be obtained in a four-span design illustrated in FIG. 8. In the four-span embodiment, three regenerators 850, 860 and 870 are positioned approximately equidistant on a fiber span, thereby defining four segments 812, 813, 815 and 816 of approximately equal length. Each of the regenerators 850, 860 and 870 includes an SSB receiver 852, 862 and 872 and an SSB transmitter 854, 864 and 874, respectively. The original SSB signal generated in transmitter 810 is assumed to be contained in the upper sideband of a modulated carrier (although the lower sideband could also be used), and the sideband is subsequently 'flipped' or reversed at each regenerator 850, 860 and 870; in addition, the modulator bias is adjusted so that transmitters 810 and 864 in regenerator 860, are non-inverting and the transmitters 854 and 874 in regenerators 850 and 870, respectively, are inverting. This four-stage transmission causes a cancellation of the second-order distortion effects, even in the presence of dispersion.

Figure 9A:
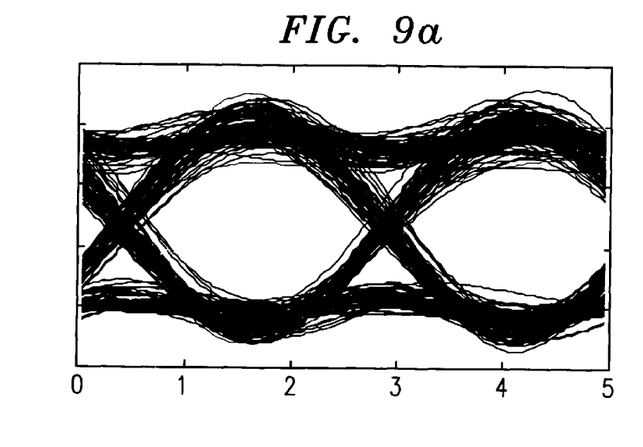
FIGS. 9(a) and 9(b) show the received eye diagrams for the four-span transmission arrangement of FIG. 8, for m=0.3 and for m=0.2, respectively.
Figure 9B:
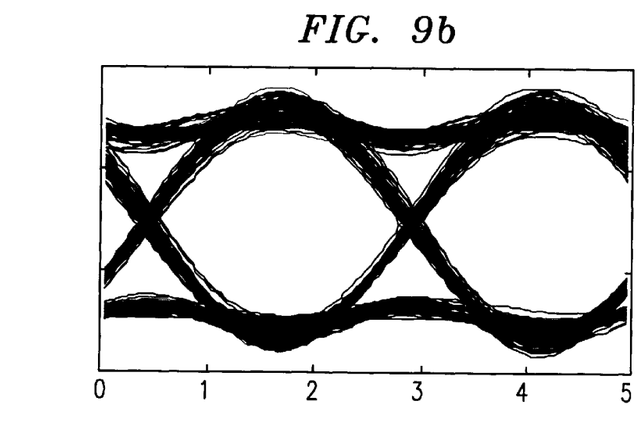

The effectiveness of the four-span arrangement of FIG. 8 is illustrated in FIGS. 9(a) and 9(b), which show the received eye diagrams for z=0.3 and for z=0.2, respectively. Note that the eye diagrams appear more fully opened after the four-span transmission (160 km) than they do after the two-span transmission (80 km).

It is seen from the foregoing that in the arrangement of FIG. 8, there are two effects that are being mitigated: chromatic dispersion, which is mitigated by doing SSB transmission with sideband "flipping", and distortion, which is introduced by the SSB transmission format, and which is mitigated by doing signal inversion at alternating regenerator sites.

Referring now to FIG. 10, there is shown a diagram illustrating phase conjugation using SSB transmission and complementary sideband regeneration in accordance with the present invention, by plotting the frequency spectrum of the information bearing signals at various points in the transmitter/receiver system. In FIG. 10(a), the complete frequency spectrum of the baseband signal is shown, illustrated as lobes of width $\omega_s$. The signal is represented as having a spectral amplitude density A. Note that the complete frequency spectrum is shown, including both positive and negative frequencies. As the signal is assumed to be real in the time domain, the spectrum must have conjugate symmetry in the frequency domain; thus the signal is represented as A* at negative frequencies. (Note that A* represents the conjugate of A.) When the data signal of FIG. 10(a) modulates a carrier of frequency $\omega_0$, and this modulated carrier is subsequently filtered to eliminate the lower sideband, the result is as illustrated in FIG. 10(b), where the transmitted information is contained only in the upper sideband. When the latter signal is transmitted through a fiber span with transfer function H, the result is as shown in FIG. 10(c). The transfer function H has been imprinted on the signal, now shown in FIG. 10(b) as HA and H*A* in the positive and negative frequency ranges, respectively.

Figure 10A:
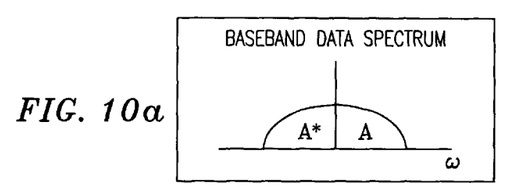
FIG. 10 is a diagram illustrating phase conjugation using SSB transmission and complementary sideband regeneration in accordance with the present invention, by plotting the frequency spectrum of the information bearing signals at various points in the transmitter/receiver system.
Figure 10B:
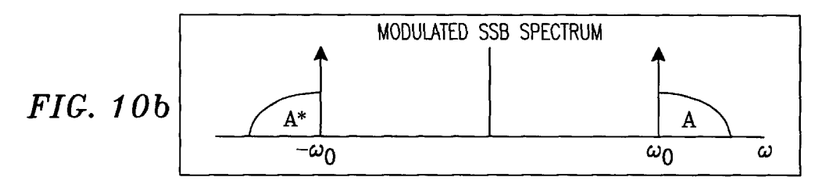
Figure 10C:
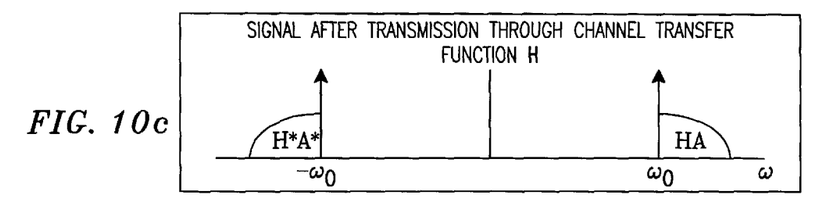
Figure 10D:
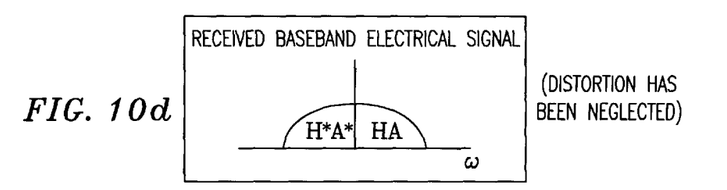
Figure 10E:
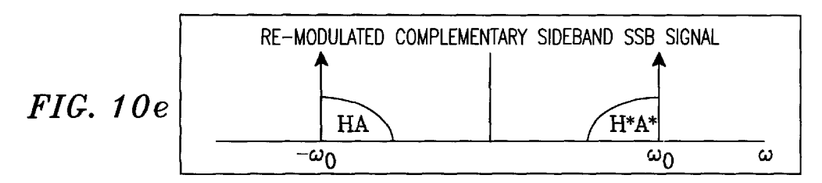
Figure 10F:
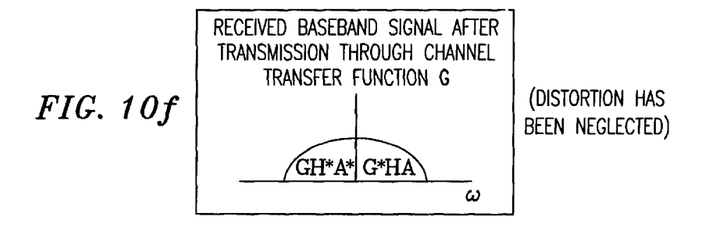

When the SSB signal of FIG. 10(c) is received (as for example, in regenerator 650 of FIG. 6), the resulting baseband signal is shown in FIG. 10(d), and has upper and lower lobes given by HA and H*A*. (Distortion effects introduced in the square-law detection process have been neglected for simplicity.) When this data signal is then used to remodulate a carrier of frequency $\omega_0$, the result is as illustrated in FIG. 10(e). The modulated carrier is filtered to eliminate the upper sideband, and the modulated signal occupies only the lower sideband, with the spectral amplitude now represented as H*A* for the positive frequency band from $+\omega_0$ to $+\omega_0-\omega_s$ and HA for the negative frequency band $-\omega_0$ to $-\omega_0+\omega_s$. The retransmitted signal is the phase conjugate of the received signal. When the latter signal is transmitted through a fiber span with transfer function G and applied to an SSB receiver, the resulting baseband signal is as shown in FIG. 10(f), where the received spectral amplitudes in the positive and negative frequencies are G*HA and GH*A* respectively. If the invention is arranged such that G and H are relatively equal, then the quantities G*H and GH* automatically cancel all phase distortion resulting from even orders of chromatic dispersion.

In the foregoing detailed description, it is seen that the CSR technique can be used to compensate for chromatic dispersion. It should be noted that CSR differs from the previously mentioned OPC technique in one important respect: the optical-electrical conversion process at the CSR regenerators destroys the absolute phase information of the optical signal. In OPC, it is possible (through careful balancing of the power profile symmetry in the fiber spans) to compensate for all nonlinear optical degradations due to the Kerr effect. See, for example, an article by I. Brener et al. entitled "Cancellation of all Kerr nonlinearities in long fiber spans using a $LiNbO_3$ phase conjugator and Raman amplification" that appeared in OFC2000 Post-deadline session PD33 (Baltimore, Md.). This is not possible in the CSR method: effects that involve multiple WDM channels (such as four-wave mixing and cross-phase modulation) cannot be compensated, as the relative phases between the optical channels will be scrambled upon electrical regeneration. However, self-phase modulation, a nonlinear degradation that involves only a single channel, can likely be compensated by CSR. This is because the relative phase relationships among the spectral components of an individual optical channel are preserved across the CSR regenerator. This makes CSR a potentially valuable technique for improving long reach fiber-optic transmission systems.

Various modifications of this invention will occur to those skilled in the art. Nevertheless, all deviations from the specific teachings of this specification that basically rely upon the principles and their equivalents through which the art has been advanced are properly considered within the scope of the invention as described and claimed.

I claim:

1. An optical transmission system including:
   first and second spans of optical fiber, each of approximately the same length,
   a transmitter for modulating a first carrier signal with an information bearing signal and for applying one sideband of said modulated first carrier signal to said first optical fiber span, and
   a regenerator at the midpoint between said first and second spans of optical fiber arranged to (a) demodulate the SSB signal received from said transmitter, and (b) perform an electrical phase conjugation of the demodulated SSB signal by transmitting on said second optical fiber span a SSB modulated second carrier signal having a sideband reversal as compared to said received SSB signal.

2. An optical transmission system including:
   a transmitter connected to a first end of a span of optical fiber and arranged to couple a SSB modulated carrier to said optical fiber, and
   a receiver connected to a second end of said span of optical fiber and arranged to receive a SSB modulated carrier and recover information contained therein, wherein said system further includes
   at least one regenerator positioned intermediate said first and second ends of said span of fiber, said regenerator arranged to perform an electrical phase conjugation of said SSB signal.

3. An optical transmission system comprising:
   a mid-span analog SSB regenerator interposed between first and second interconnected optical transmission line spans,
   an input transmitter arranged to receive an input signal and to modulate a carrier such that either the upper or lower sideband is transmitted on the first optical transmission line span to the mid-span regenerator,
   an electrical receiver/transmitter arrangement in said mid-span analog SSB regenerator arranged to reduce the distortion effects produced through square-law detection of the SSB signal by inverting the SSB signal received in said mid-span analog SSB regenerator.

4. The invention defined in claim 3 wherein said SSB signal is inverted by controlling a modulator bias in the transmitter included in the receiver/transmitter arrangement.

5. An optical communication system including:
   a transmitter connected to a first end of a span of optical fiber and arranged to couple the upper or lower sideband of a SSB modulated carrier to said optical fiber, and
   a receiver connected to a second end of said span of optical fiber and arranged to receive the lower or upper sideband of a SSB modulated carrier and recover information contained therein, wherein said system further includes
   at least one regenerator positioned intermediate said first and second ends of said span of fiber, said regenerator arranged to modulate a carrier such that the complementary sideband is applied to the second optical transmission line span.

6. An optical communication system comprising:
   a span of optical fiber
   three mid-span analog SSB regenerators interposed in said optical fiber span, wherein the distance between adjacent ones of said regenerators is approximately equal,
   each of said regenerators including electrical receivers and transmitters that (i) receive an SSB signal on one sideband (upper or lower) (ii) transmit the SSB signal on the other sideband (lower or upper, respectively), and (iii) with respect to the first and third regenerators only, perform an inversion of the signal.

7. An optical communication method comprising the steps of:
   interposing a mid-span analog SSB regenerator between first and second interconnected optical transmission line spans,
   in an input transmitter, receiving an input signal and modulating a carrier such that either the upper or lower sideband is transmitted on the first optical transmission line span to the mid-span regenerator, and
   in an electrical receiver/transmitter arrangement in said mid-span analog SSB regenerator, reducing the distortion effects produced through square-law detection of the SSB signal by inverting the SSB signal received in said mid-span analog SSB regenerator.

* * * * *